July 12, 1949.  R. R. GUNDERSON  2,476,089
HYDRAULIC BOOSTER SYSTEM FOR BRAKES
Filed Dec. 11, 1947  2 Sheets-Sheet 1
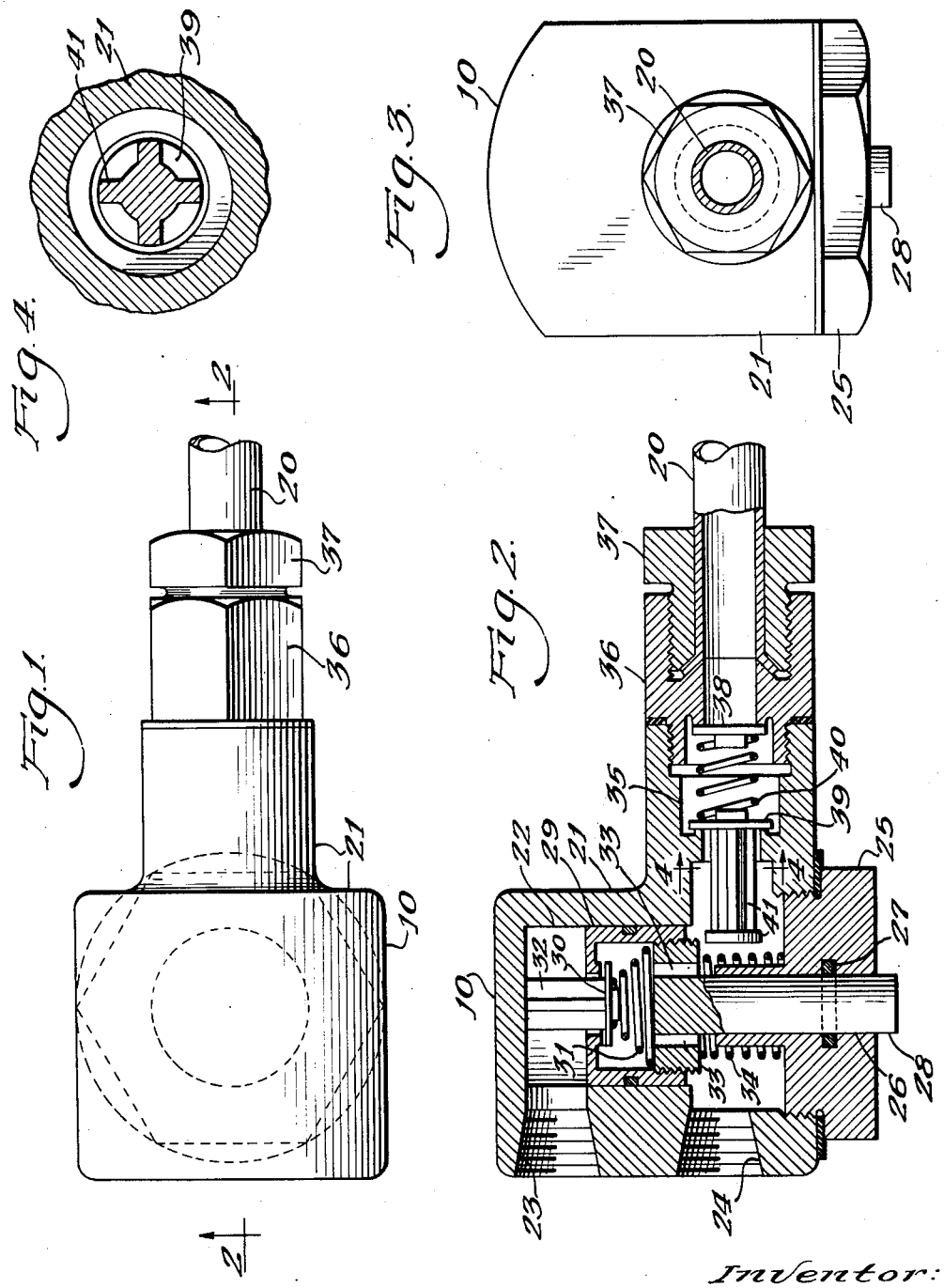
Inventor:
Ralph R. Gunderson
By Chitton, Schroeder, Merriam & Hofgren
Attorneys July 12, 1949.    R. R. GUNDERSON    2,476,089
HYDRAULIC BOOSTER SYSTEM FOR BRAKES
Filed Dec. 11, 1947
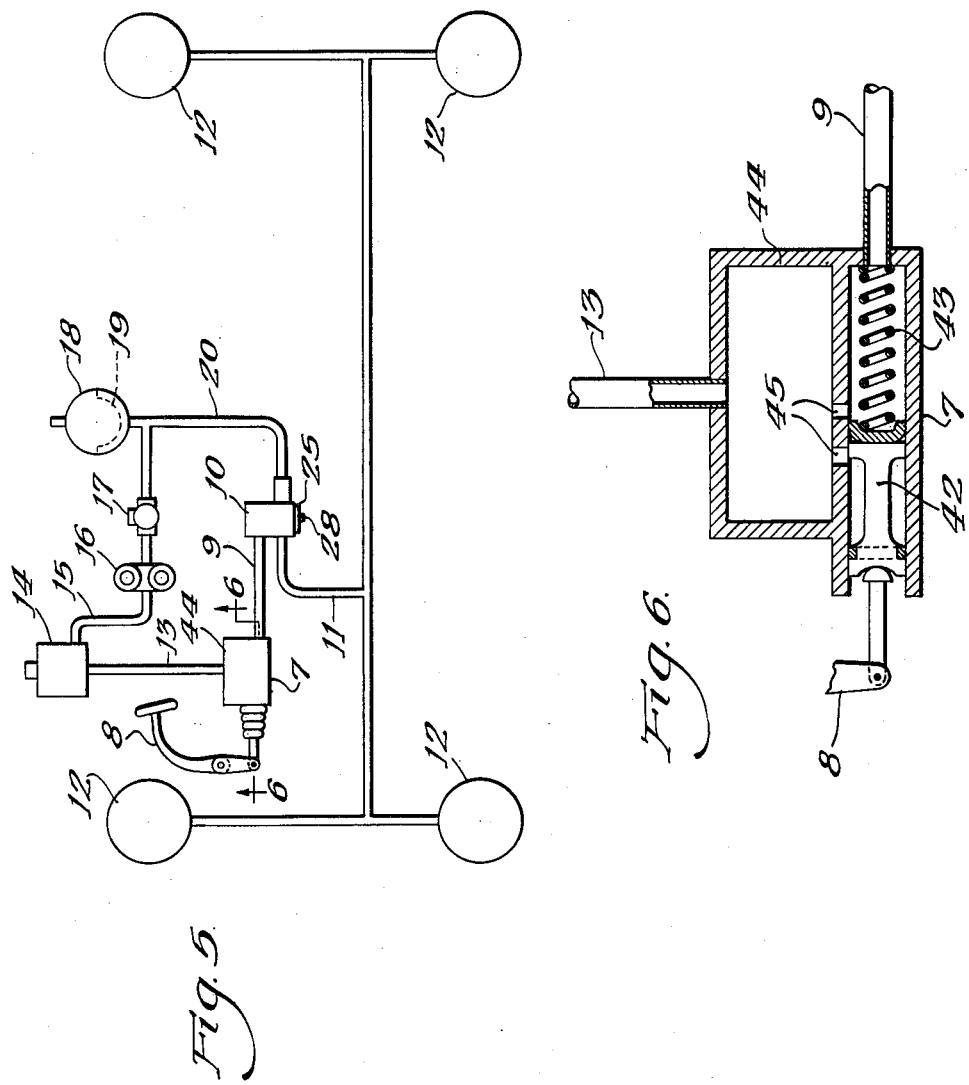
Inventor:
Ralph R. Gunderson
By
Chittor, Schroeder, Merriam & Hofgren
Attorneys Patented July 12, 1949

2,476,089

UNITED STATES PATENT OFFICE 2,476,089

HYDRAULIC BOOSTER SYSTEM FOR BRAKES

Ralph R. Gunderson, Chicago, Ill.

Application December 11, 1947, Serial No. 791,085

6 Claims. (Cl. 60—54.5)

This invention relates to hydraulic pressure brake systems and more particularly to an improved booster valve unit which will permit the slack to be taken up in the brake system by a low pressure fluid in the master cylinder, and then automatically admit fluid under high pressure from an auxiliary system under control of the master cylinder.

The invention is adapted for use on airplane brakes, or on other brakes of the type used on automobiles and trucks.

The primary object of the invention is to provide a simplified and economical method of connecting high pressure hydraulic motorizing force to a low pressure type of actuating system.

A further object of the invention is to provide a system whereby the volume of brake fluid required to take up the slack in the system is supplied at low pressure by the master cylinder, so that only a small volume of fluid from the high pressure system is required to supply the final stopping power. This enables a small size pump, that is inexpensive to operate, to furnish the required high pressure fluid.

Another object of the invention is to provide a system wherein the high pressure application is in direct ratio to the low pressure force.

A further object of the invention is to provide a system wherein the brakes may be set by physical pressure applied to the master cylinder to operate the brakes directly, in the event of failure of the high pressure auxiliary.

Vehicles in operation may be converted into an improved high pressure system by the addition of a high pressure auxiliary and a booster valve unit. The booster valve unit may be a separate part, or it may be built into the master cylinder unit.

The invention is illustrated in a preferred embodiment in the accompanying drawings in which—

Figure 1 is a plan view of the booster valve unit; Fig. 2, a sectional view, taken as indicated at line 2—2 of Fig. 1; Fig. 3, an end elevational view of the device; Fig. 4, a fragmentary sectional view, taken as indicated at line 4—4 of Fig. 2; Fig. 5, a diagrammatic view of a brake system embodying the invention; and Fig. 6, a fragmentary sectional view of the master cylinder unit, taken as indicated at line 6—6 of Fig. 5.

In the system illustrated in Fig. 5, a master cylinder unit 7 is provided with a foot pedal 8 for displacing brake fluid at low pressure through a conduit 9 to a booster valve unit 10. A conduit 11 leads from the booster valve unit to the wheel-cylinder brakes 12. Brake fluid, when the brakes are released, will travel back through the master cylinder and a conduit 13 to a reservoir 14. Fluid is pumped from the reservoir through a conduit 15, by means of a high pressure pump 16 through a check valve 17 to an accumulator 18, which may be provided with a flexible diaphragm 19. The accumulator supplies high pressure brake fluid through a conduit 20 to the booster valve unit 10.

The booster valve unit 10 is best shown in Figs. 1, 2 and 3, and has a housing 21 provided with a control cylinder 22. One end of the cylinder is provided with a port 23, to which the conduit 9 may be connected for communication with the master cylinder 7. The other end of the control cylinder has a port 24 for connection with the conduit 11 leading to the wheel-cylinders 12. The wheel-cylinder end of the control cylinder is closed by a removable head 25, which has an opening 26 axially disposed with respect to the control cylinder and is provided with a packing 27, to receive the shank 28 of a piston member provided in the control cylinder 22.

The piston member has a hollow head 29 to which a valve member 30 is urged by a compression spring 31 to close communication through the piston head. The valve has an arm 32 which normally will engage the end of the control cylinder and open communication on the master cylinder side of the piston to the wheel-cylinder side through ports 33. A compression spring 34 urges the piston head upwardly into open position, as illustrated in Fig. 2.

The booster valve unit housing also has a conduit 35, to which is connected a high pressure fluid line 20 by means of a fitting 36 and a nut 37. A check valve 38 is provided in the fitting 36, so as to prevent any brake fluid from passing outwardly from the unit through the conduit 20. The conduit 35 is provided with a pressure valve 39 opposite to the check valve 38, and both valves are urged to closed position by means of a single compression spring 40. The pressure valve 39 has an inwardly extending actuating arm 41, which is adapted to be engaged by the piston member to open the valve when the piston member is moved towards the wheel-cylinder end of the control cylinder.

The master cylinder shown in Fig. 6 may be of conventional construction, having a pedal operated plunger 42 closed by a compression spring 43. A fluid chamber 44 may be provided above the master cylinder and provided with ports 45 to keep the master cylinder flooded and permit brake fluid returning from the booster valve unit through the conduit 9 to travel upwardly through the conduit 13 to the reservoir 14.

The high pressure pump 16 operates automatically to maintain high pressure in the accumulator 18, and the check valve 17 prevents high pressure liquid from traveling back through the pump when it is not running.

Operation

When it is desired to apply the brakes, pressure is exerted on the pedal 8, so as to displace fluid from the master cylinder through the piston 29 in the control cylinder and directly to the wheel-cylinders 12. As pressure builds up in the system, the piston 29 will begin to move downwardly because the area on the upper side of the piston is greater than the area on the lower side, because of the shank portion 28. In this movement, the valve 30 will be closed by the spring 31, and when the piston has travelled a sufficient distance the piston will strike the arm 41, rocking the valve 39 from its seat and admitting high pressure brake fluid to the wheel-cylinder side of the system. As the pressure increases, the piston 29 will be forced back towards the master-cylinder side, and the admission of high pressure fluid is controlled in a direct ratio to the low pressure force of the pedal. Thus it will be understood that the application of the brakes is fully controlled by the pedal at all times.

When the pedal pressure is relaxed, the piston moves back towards the position shown in Fig. 2, and the excess fluid which was admitted through the valve 39 travels back through the master cylinder to the reservoir 14.

The check valve 38 is a safety feature. If, for any reason, there should be a failure in the pump or accumulator, the brakes could be applied by pedal pressure through the piston member to the wheel-cylinder. The check valve 38 would prevent any of the fluid from the master cylinder passing down into the conduit 20.

It is well known in the art that diaphragms may be used in place of pistons and accordingly it will be understood that the term "pressure movable actuator in a chamber" is intended to include either a piston in a cylinder or a diaphragm in a chamber.

The foregoing detailed description is given for clearness of understanding only, and no unnecessary limitations should be understood therefrom, for some modifications will be obvious to those skilled in the art.

I claim:

1. In a hydraulic brake system: a master cylinder having pedal actuated means for displacing brake fluid from said master cylinder under low pressure; wheel-cylinders for actuating brakes; a source of brake fluid under high pressure; and a booster valve unit having a control chamber communicating at one end with said master cylinder and at the other end with said wheel-cylinders, a pressure movable actuator in said control chamber and having a shaft of reduced diameter extending slidably through a liquid sealed opening in the wheel-cylinder end of the chamber, a spring urging said actuator towards the master-cylinder end of said chamber, a spring valve controlling an opening through the actuator and having an arm for opening communication through the actuator when said actuator is in its normal position at the master-cylinder end of the control chamber, a conduit connecting said source of brake fluid under high pressure to the wheel-cylinder end of said chamber, and a normally closed pressure valve in said conduit having an actuating means for engagement by the actuator to open said valve when the actuator is moved towards the wheel-cylinder end of the control chamber.

2. A hydraulic brake system as specified in claim 1, in which a brake fluid reservoir is provided, the master cylinder is provided with a port leading to said reservoir, and the source of brake fluid at high pressure includes a power driven pump to pump brake fluid from the reservoir to the conduit.

3. A hydraulic brake system as specified in claim 1 in which an accumulator is connected to the conduit and a check valve is provided between the pressure valve and conduit so that the master cylinder may operate the wheel-cylinders in the event of pressure failure of said accumulator.

4. A booster valve unit for a hydraulic brake system, comprising: a housing having a control cylinder adapted to be connected at one end to a master-cylinder and at the other end to wheel-cylinders, and an axially disposed opening through said housing in the wheel-cylinder end; a piston member having a hollow head in said control cylinder and a shank making a liquid tight sliding connection with said axial opening; a compression spring urging said piston member towards the master-cylinder end of the control cylinder; a spring valve in the piston member having an arm for engaging the master cylinder end of the control cylinder and opening communication through said piston head; a conduit in said housing to receive high pressure brake fluid; a normally closed pressure valve in said conduit for controlling the flow of brake liquid to the wheel-cylinder end of the control cylinder, said valve having an actuating arm to be engaged by said piston member to open the valve when the piston member is moved towards the wheel-cylinder end.

5. A booster valve unit as specified in claim 4, in which a check valve is provided in the conduit opposite the pressure valve, and a single compression spring urges both of said valves to closed position.

6. A booster valve unit as specified in claim 4, in which a removable head is provided in the housing on the wheel-cylinder end of the control cylinder, and the axial opening for the piston shank is through said removable head.

RALPH R. GUNDERSON.

No references cited.